US006455978B1

(12) United States Patent
Krefta et al.

(10) Patent No.: US 6,455,978 B1
(45) Date of Patent: Sep. 24, 2002

(54) HYBRID TWIN COIL ELECTRICAL MACHINE

(75) Inventors: Ronald John Krefta, Noblesville; Frederick B. Reiter, Jr., Cicero, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/649,348

(22) Filed: Aug. 28, 2000

(51) Int. Cl.$^7$ ................................................. H02K 1/22
(52) U.S. Cl. ................................. 310/263; 310/156.66
(58) Field of Search ..................... 310/156.66, 156.72, 310/179–181, 263; 29/596–598

(56) References Cited

U.S. PATENT DOCUMENTS

| | | | | |
|---|---|---|---|---|
| 3,303,369 | A | * | 2/1967 | Erickson ..................... 310/263 |
| 4,980,595 | A | * | 12/1990 | Arora ......................... 310/263 |
| 5,130,595 | A | * | 7/1992 | Arora ......................... 310/268 |
| 5,270,604 | A | * | 12/1993 | Sandel et al. ................ 310/263 |
| 5,552,651 | A | * | 9/1996 | Radomski ................... 310/181 |
| 5,892,313 | A | * | 4/1999 | Harris et al. ................ 310/263 |
| 6,066,906 | A | * | 5/2000 | Kalsi ........................... 310/179 |
| 6,144,138 | A | * | 11/2000 | Ragaly ....................... 310/263 |
| 6,359,366 | B1 | * | 3/2002 | Liang et al. ................. 310/263 |

OTHER PUBLICATIONS

Krefta et al, Attorney Docket No. DP–300206, "Hybrid Electrical Machine with Axial Flux Magnet," filed concurrently with this application. (091650,334 filed on Aug. 28, 2000).

Krefta et al, Attorney Docket No. DP–300207, "Hybrid Electrical Machine with Axially Extending Magnets," filed concurrently with this application. (091649,306) filed on Aug. 28, 2000).

* cited by examiner

*Primary Examiner*—Tran Nguyen
(74) *Attorney, Agent, or Firm*—Margaret A. Dobrowitsky

(57) ABSTRACT

A hybrid electrical machine having a permanent magnetic rotor field in addition to an electrically excited rotor field is disclosed. The generator rotor (220) has two opposing claw segments (226, 228) mounted at opposite ends of a rotor shaft (222). A third, center claw segment (232) is mounted on the rotor shaft between the first and second claw segments. A first wound field coil (224) is mounted on the rotor shaft between the first and third claw segments, and a second wound field coil (234) is mounted between the second and third claw segments. One or more permanent magnets (230, 231) may be provided about the periphery of the first, second, and/or third claw segments.

17 Claims, 4 Drawing Sheets

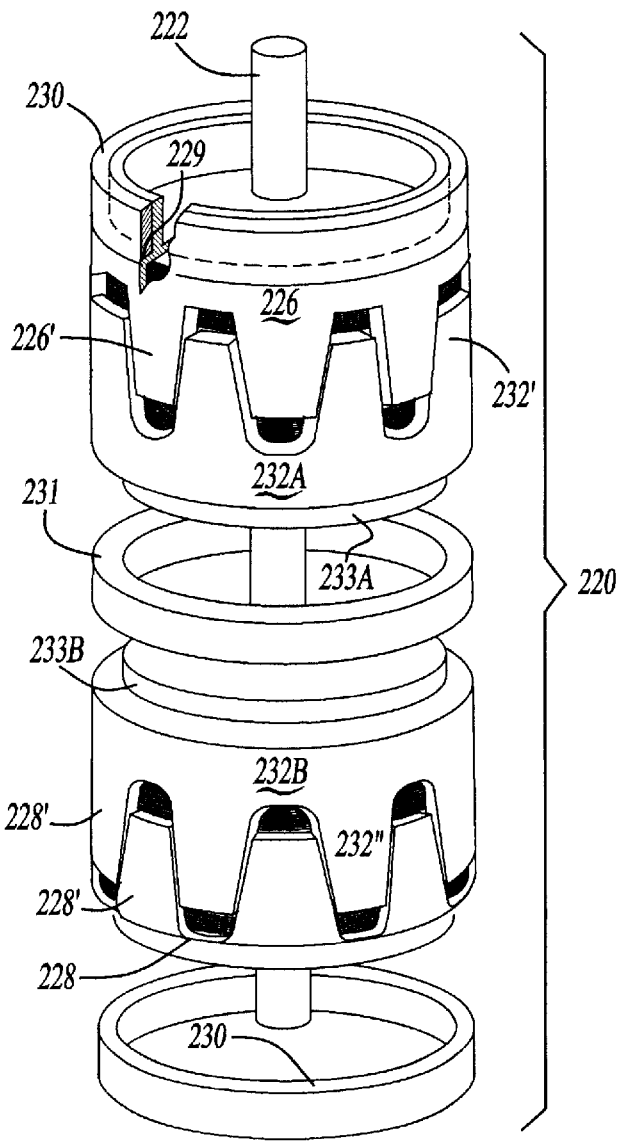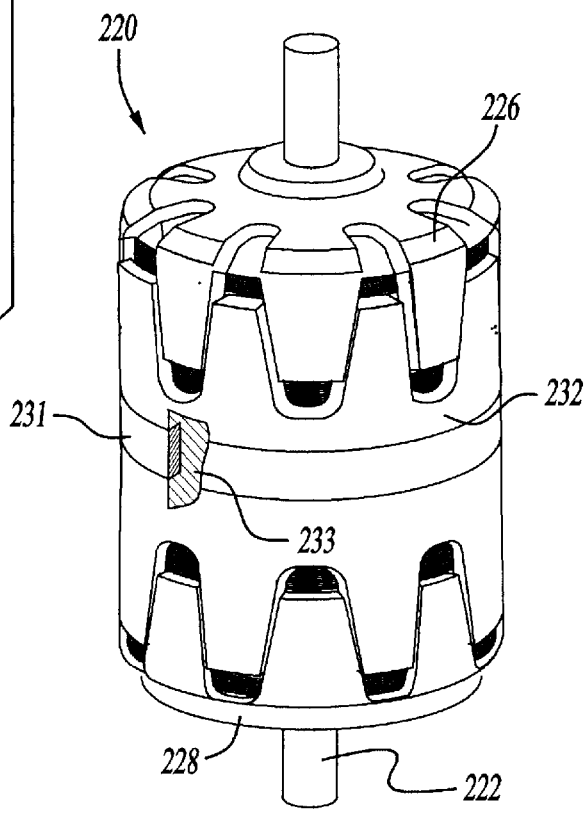
FIG. 5
FIG. 6

HYBRID TWIN COIL ELECTRICAL MACHINE

BACKGROUND OF THE INVENTION

1. The Technical Field

The invention relates generally to electrical machines, such as motors and generators, and, more particularly, to electrical machines having hybrid rotors, i.e., both electric and permanent magnet excitation.

2. The Prior Art

Lundell-type electrical machines are well-known in the art. For example, Lundell-type electrical generators have long been used in the automotive industry to provide electrical power for automobiles and trucks. Due to consumer demand for power consuming convenience and luxury items, such as high-powered sound systems, power windows, and the like, as well as the need for the complicated control systems required to meet government emission and safety standards, electrical demands on modern automobiles have increased substantially over the years. Although the output of a conventional Lundell-type generator can be increased to meet the increased electrical demand, the additional electrical output comes at the expense of additional size and weight. Since underhood space on modern automobiles is limited, the use of a physically larger generator to meet a vehicle's increased electrical demands might not be an acceptable design solution in some cases. Further, as vehicle weight increases, fuel economy and performance decrease.

An electrical generator's output can be increased without a proportional increase in size and weight by using a permanent magnetic field to supplement the conventional electrically-generated rotor field. U.S. Pat. Nos. 4,959,577 and 5,483,116 disclose hybrid Lundell-type generators having a plurality of discrete permanent magnet segments located between the interleaved fingers of the rotor claw segments. However, the designs disclosed by the foregoing references involve complicated arrangements of magnets and magnet holders, thus making the generator difficult to assemble.

It would be desirable to provide an electrical generator which provides high specific output, using proven design principles, in a relatively lightweight, compact, easy-to-assemble package.

SUMMARY OF THE INVENTION

The invention is a hybrid Lundell-type electrical machine characterized by a rotor whose magnetic field is established using one or more conventional field coils and one or more permanent magnets.

A conventional Lundell-type generator rotor includes a bobbin-wound field coil mounted on a rotor shaft to generate a magnetic field. The magnetic field flux is transferred through two claw-type rotor segments forming the north and south poles, respectively, of the magnet thus-created. The magnetized rotor assembly spins inside a stator having a number of windings which are "cut" by the magnetized rotor's flux lines so as to induce an electrical current in the stator windings.

The output of a Lundell-type generator is a function of the rotor magnetization, among other parameters. Rotor magnetization is a function of the magnetic field strength in the rotor, which, in turn, is a function of the field coil excitation current. That is, by increasing the field coil excitation current, and thereby increasing the induced magnetic field strength in the claw segments, the rotor magnetization can be increased. However, the magnetization of the claw segments can be increased only up to a certain level, based on the size and material composition of the claw segments, beyond which the claw segments become magnetically saturated. Once the claw segments become saturated, their magnetization does not continue to increase with increased magnetic field strength. Therefore, as a practical matter, the maximum rotor magnetization in a conventional Lundell-type generator is a function of the rotor's size and, more particularly, the claw segments' size.

Permanent magnets can be used in lieu of a field coil to magnetize a generator rotor, and they can provide greater rotor magnetization than a field coil of comparable size. However, the output voltage of a generator using only a permanent magnet to establish rotor magnetization is not easily controlled.

The present invention is directed to a hybrid electrical machine whose rotor magnetization is established using a combination of one or more electrically excitable field coils and one or more permanent magnets; the remainder of the machine may be conventional. The permanent magnet provides a base level of rotor magnetization. The rotor's magnetization can be increased above the base level of magnetization provided by the permanent magnet, subject to the limitations discussed above, by electrically exciting the field coil. Since a permanent magnet of a given size can effect a greater level of rotor magnetization than a field coil/claw segment assembly of the same size, a hybrid rotor according to the present invention can achieve a higher level of magnetization than a conventional rotor of the same size. Alternatively, a hybrid rotor according to the present invention having a predetermined level of magnetization can be smaller and lighter than a conventional Lundell-type generator rotor having the same level of magnetization.

A first embodiment of a hybrid rotor according to the present invention comprises an otherwise conventional Lundell-type generator rotor (i.e., a rotor shaft having a field coil and two claw segments, each claw segment having a plurality of axially-extending fingers) having one or more radially-magnetized permanent magnets located about the periphery of each of the claw segments. In a preferred embodiment, a ring magnet is provided for each claw segment (i.e. each hybrid rotor includes two ring magnets). In an alternate first embodiment, a plurality of discrete magnets may be used in place of one or both of such ring magnets. In any case, the magnet or magnets associated with each claw segment have a number of magnetic poles equal to twice the number of fingers associated with the respective claw segment.

In a second embodiment of the invention, the hybrid rotor includes first and second claw segments mounted on a shaft, as would a conventional Lundell-type generator rotor. The rotor further includes a third claw segment located between the first and second claw segments. The third claw segment has fingers extending axially in both directions, towards both the first and second claw segments, such that the fingers of the third claw segment are interleaved with the fingers of the first and second claw segments. A first field coil is located between the first and third claw segments and a second field coil is located between the second and third claw segments. One or more permanents magnets are located about the periphery of the first and second claw segments, in the same manner as discussed above for the first embodiment. In an alternate second embodiment, one or more permanent magnets are located about the periphery of the third claw segment, but not the first and second claw segments. In another alternate second embodiment, one or more permanent magnets are located about the periphery of the first, second, and third claw segments.

In a third embodiment of the invention, the hybrid rotor includes first and second claw segments mounted on a non-magnetic shaft. The rotor further includes a third claw segment located between the first and second claw segments. The third claw segment has fingers extending axially in both directions, towards both the first and second claw segments, such that the fingers of the third claw segment are interleaved with the fingers of the first and second claw segments. A first field coil is located between the first and third claw segments, and an axially-magnetized permanent magnet comprising a ring magnet or a plurality of discrete magnets is located between the second and third claw segments. In an alternate third embodiment, one or more radially-magnetized permanent magnets also may be located about the periphery of the first, second, and/or third claw segments.

This application is being filed contemporaneously with related U.S. patent application Ser. No. 09/650,334 entitled "Hybrid Electrical Machine with Axial Flux Magnet," and related U.S. patent application Ser. No. 09/649,306 entitled "Hybrid Electrical Machine with Axially Extending Magnets," both of which are owned by common assignee Delphi Technologies, Inc.

Additional advantages and features of the present invention will become apparent from the reading of the attached description and the following set of drawings.

BRIEF DESCRIPTION OF THE DRAWINGS

The present invention will now be described, by way of example, with reference to the accompanying drawings, in which:

FIG. 5 is a perspective view of another variation of a second embodiment of a hybrid generator rotor according to the present invention;

FIG. 6 is a perspective view of a further variation of a second embodiment of a hybrid generator rotor according to the present invention;

DETAILED DESCRIPTION OF THE PREFERRED EMBODIMENTS

Figure 1:
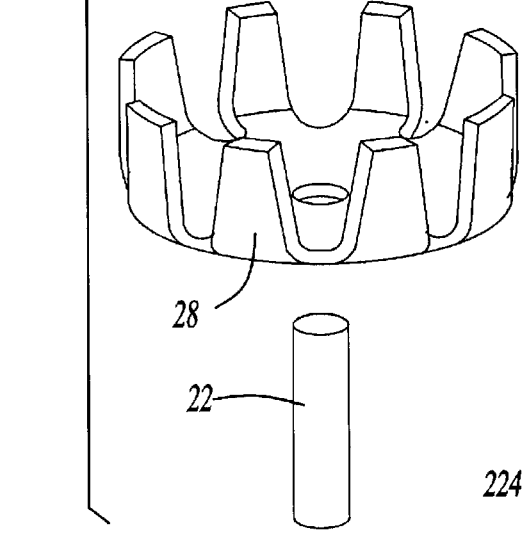
FIG. 1 is a perspective view of a conventional prior art Lundell-type generator rotor.

FIG. 1 illustrates a conventional Lundell-type generator rotor 20. Rotor 20 comprises a shaft 22, a field coil 24, a first claw segment 26, and a second claw segment 28. Field coil 24 is mounted on shaft 22 between first and second claw segments 26 and 28, respectively.

Figure 2:
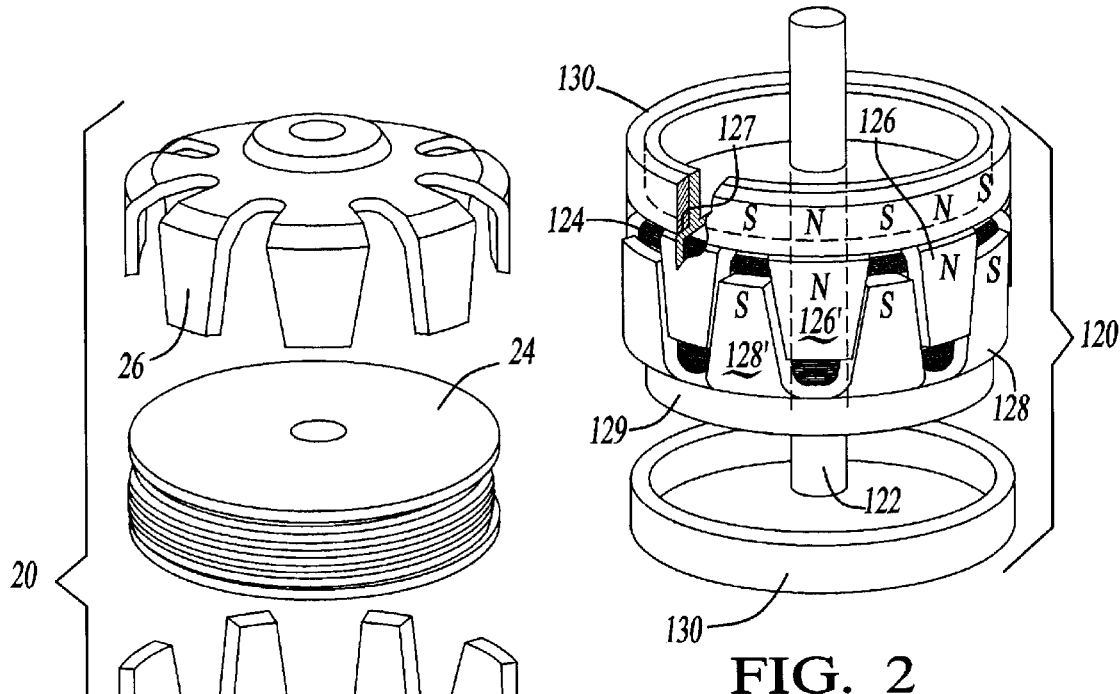
FIG. 2 is a perspective view of a first embodiment of a hybrid generator rotor according to the present invention.

FIG. 2 illustrates a first preferred embodiment of a hybrid generator rotor according to the present invention. Hybrid rotor 120 comprises a shaft 122, a field coil 124, a first claw segment 126 and a second claw segment 128. Field coil 124 is located on shaft 122 between first and second claw segments 126 and 128. Each of first and second claw segments 126 and 128 includes a plurality of axially extending fingers 126' and 128'. Fingers 126' of first claw segment 126 are interleaved with fingers 128' of second claw segment 128, so as to substantially encapsulate field coil 124. Each of first and second claw segments 126 and 128 also includes an axially-extending shelf 127 and 129, respectively, which acts as a support and magnetic backiron for one or more permanent magnets. In a preferred embodiment, a radially-magnetized ring magnet having a number of poles equal to twice the number of claw fingers 126' or 128' on claw segments 126 and 128, respectively, is mounted on each shelf 127 and 129. In other embodiments, either or each of ring magnets 130 may be replaced with a plurality of radially-magnetized discrete magnets, such as a plurality of bar magnets (see FIG. 3A). In any case, the ring magnet 130 or the plurality of bar magnets (see FIG. 3A) associated with each claw segment 126, 128 has a number of magnetic poles equal to twice the number of fingers associated with the respective claw segment 126, 128.

Figure 3:
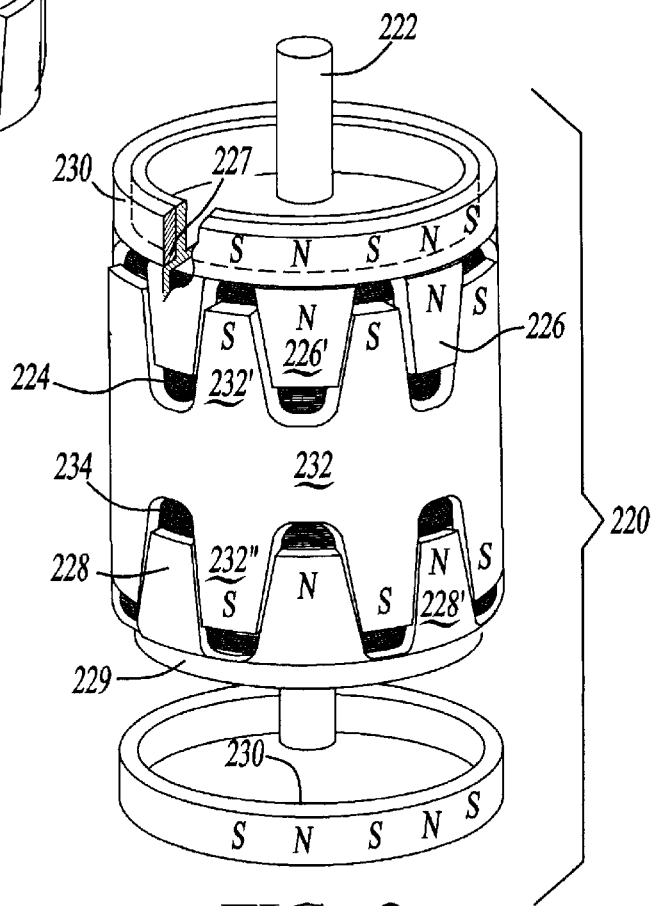
FIG. 3 is a perspective view of a second embodiment of a hybrid generator rotor according to the present invention.

FIG. 3 illustrates a second embodiment of a hybrid generator rotor according to the present invention. Hybrid rotor 220 comprises a shaft 222, a first claw segment 226, and a second claw segment 228. Hybrid rotor 220 further includes a third claw segment 232 which is located between first and second claw segments 226 and 228. First claw segment 226 has a plurality of axially-extending fingers 226' and second claw segment 228 also has a plurality of axially-extending fingers 228'. Third claw pole segment 232 has a first plurality of axially-extending fingers 232' and a second plurality of axially-extending fingers 232". A first field coil 224 is located between first claw pole segment 226 and third claw pole segment 232, such that first field coil 224 is substantially encapsulated by claw fingers 226' and 232'. A second field coil 234 is located between second and third claw pole segments 228 and 232, such that second field coil 234 is substantially encapsulated by claw fingers 228'0 and 232".

Each of first and second claw segments 226 and 228 also includes an axially-extending shelf 227 and 229, respectively, which acts as a support and magnetic backiron for one or more permanent magnets. In a preferred embodiment, a ring magnet 230 is mounted on each shelf 227 and 229. In other embodiments, either or each of ring magnets 230 may be replaced with a plurality of discrete magnets, such as a plurality of bar magnets, mounted on axially-extending shelves 227 and 229. In any case, the ring magnet 230 or the plurality of bar magnets 225 shown in FIG. 3A associated with each claw segment 226, 228 has a number of magnetic poles equal to twice the number of fingers associated with the respective claw segment 226, 228.

Figure 4:
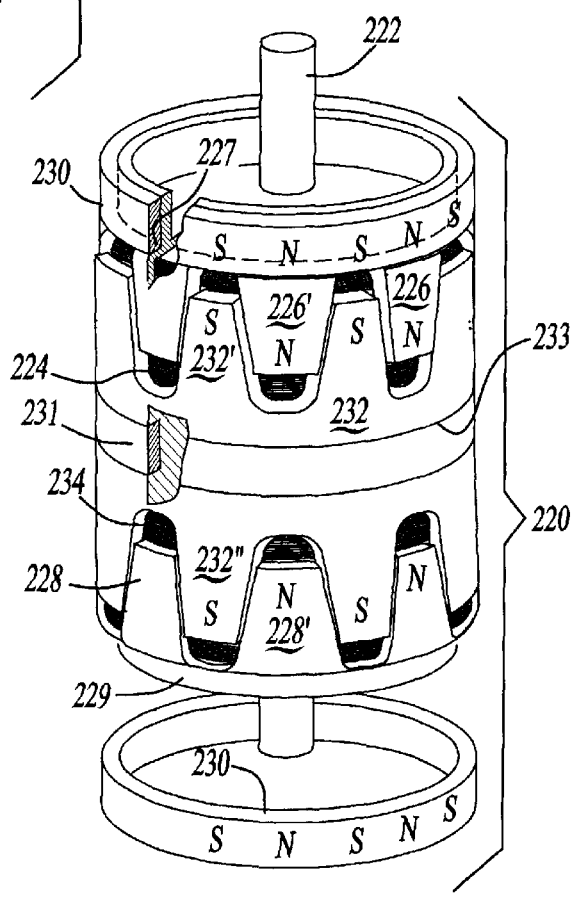
FIG. 4 is a perspective view of a variation of a second embodiment of a hybrid generator rotor according to the present invention.

FIG. 4 illustrates a variation of the foregoing second embodiment wherein rotor 220 comprises third claw segment 232 is provided with a circumferential channel 233 about its periphery. In a preferred embodiment, a ring magnet 231 is mounted within channel 233. In an alternate embodiment, ring magnet 231 may be replaced with a plurality of discrete magnets, such as a plurality of bar magnets (not shown), mounted within channel 233 about the periphery of claw segment 232. In another alternate embodiment, third claw segment 232 may be split axially into two sections 232A and 232B, each having an axially-extending shelf 233A and 233B, respectively, wherein ring magnet 231 is mounted on axially-extending shelves 233A and 233B. See FIG. 5.

FIG. 6 illustrates another variation of the foregoing second embodiment wherein third claw segment 232 is provided with a circumferential channel 233 about its periphery and wherein one or more permanent magnets, such as ring magnet 231, are mounted within channel 233, but wherein first and second claw segments 226 and 228 do not have any permanent magnets associated therewith. Accordingly, in this embodiment, first and second claw segments 226 and 228 preferably lack the axially-extending shelves 227 and 229 provided in those embodiments wherein permanent magnets are associated with first and second claw segments 226 and 228, as shown in, for example, FIGS. 3 and 4.

Figure 3A:
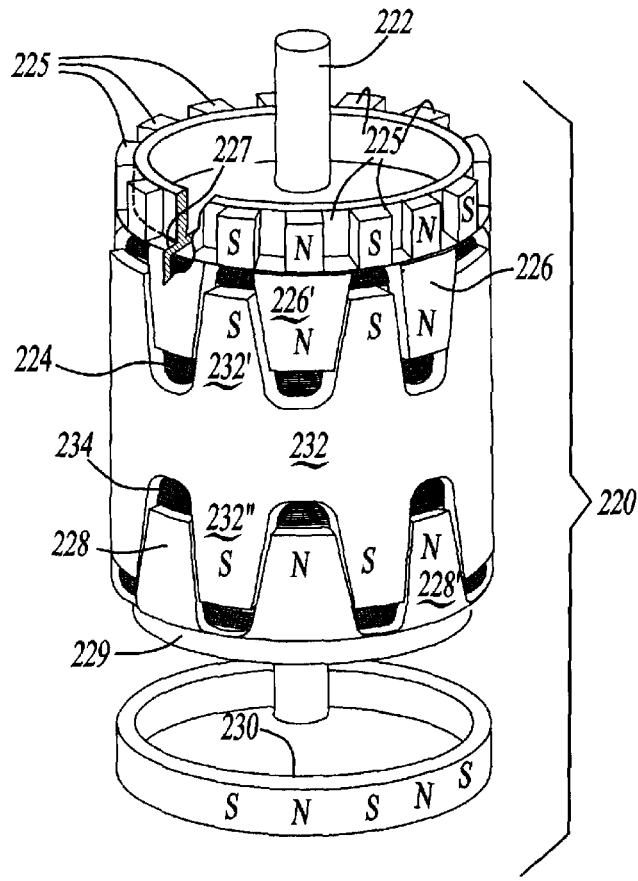
FIG. 3a is a perspective view of a variation of the second embodiment of a hybrid generator rotor according to the present invention.
Figure 7:
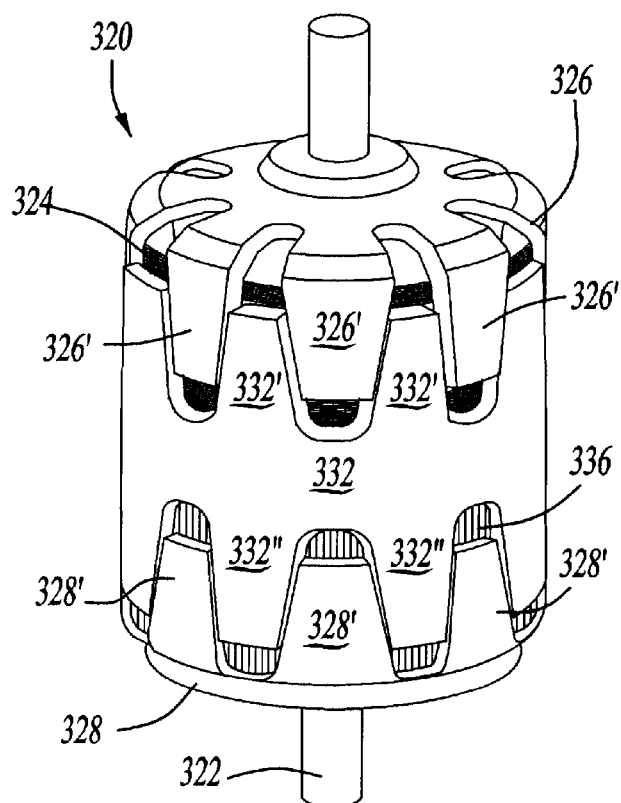
FIG. 7 is a perspective view of a third embodiment of a hybrid generator rotor according to the present invention.
Figure 7A:
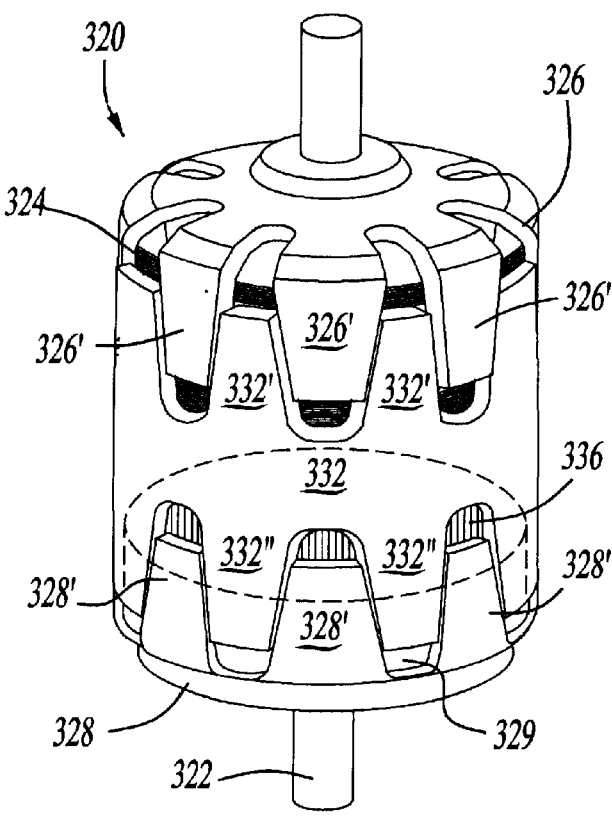
FIG. 7a is a perspective view of a variation of the third embodiment of a hybrid generator rotor according to the present invention.

FIG. 7 illustrates a third embodiment of a hybrid generator rotor according to the present invention. Hybrid rotor 320 comprises a non-magnetic shaft 322, a first claw segment 326, and a second claw segment 328. Hybrid rotor 320 further includes a third claw segment 332 which is located between first and second claw segments 326 and 328. First claw segment 326 has a plurality of axially-extending fingers 326' and second claw segment 328 also has a plurality of axially-extending fingers 328'. Third claw pole segment 332 has a first plurality of axially-extending fingers 332' and a second plurality of axially-extending fingers 332". A first field coil 324 is located between first claw pole segment 326 and third claw pole segment 332, such that first field coil 324 is substantially encapsulated by claw fingers 326' and 332'. In a preferred embodiment, an axially-magnetized ring magnet 336 is located between second and third claw segments 328 and 332, such that ring magnet 336 is substantially encapsulated by claw fingers 328' and 332". There may also be a combination of a ring magnet and a soft magnetic material axial spacer in the same space occupied by the ring magnet alone in FIG. 7, as is shown in FIG. 7a, which has spacer 329 below ring magnet 336. In other embodiments, a plurality of axially-magnetized discrete magnets, such as a plurality of bar magnets 225, as seen in FIG. 3a, may replace ring magnet 336. In variations of the third embodiment (not illustrated), one or more permanent magnets also may be located about the first, second, and/or third claw segments 326, 328, and 332, in the manner shown in FIGS. 3, 4, and 5.

The foregoing disclosure is intended merely to illustrate certain preferred embodiments of the invention. It is contemplated that those skilled in the art may find numerous ways to modify these embodiments without departing from the scope and spirit of the invention. As such, the scope of the invention is defined by the appended claims and not by the details of the specification.

I claim:

1. A rotor for an electrical machine, comprising:
    a pair of field coils being encased by a pair of claw pole segments and a center section, each of said claw pole segments having a plurality of claws for intermeshing with a plurality of claws of said center section; and
    a plurality of magnets being disposed on said center section, said plurality of magnets being of alternating polarity and being configured to align with said plurality of claws.

2. The rotor as in claim 1, wherein said plurality of magnets is a ring magnet configured to have a plurality of alternating poles.

3. The rotor as in claim 2, wherein said center section comprises
    a pair of center sections each having a plurality of claws at one end and an axially extending shelf portion at the other end, said plurality of claws of one of said pair of said center sections being configured to intermesh with said plurality of claws of one of said pair of claw pole segments and the plurality of claws of the other one of said pair of center sections being configured to intermesh with said plurality of claws of the other one of said pair of claw pole segments, said axially extending shelf portions of said pair of said center sections being configured to define a channel for receiving said ring magnet.

4. The rotor as in claim 3, wherein said axially extending portions provide a magnetic backiron for said ring magnet.

5. The rotor as in claim 2, wherein said ring magnet is received within a channel disposed on said center section.

6. The rotor as in claim 5, wherein the number of alternating poles is twice the number of said plurality of claws in either of said pair of claw pole segments.

7. The rotor as in claim 1, wherein said center section is twice the size of one of said pair of claw pole segments.

8. A rotor for an electrical machine, comprising:
    a first field coil;
    a second field coil;
    a first claw pole segment having a plurality of claws partially encasing said first field coil;
    a second claw pole segment having a plurality of claws partially encasing said second field coil;
    a center segment having a center section, a first plurality of claws and a second plurality of claws, said first plurality of claws depending outwardly from said center section and being configured to interlock with said plurality of claws of said first claw pole segment, said second plurality of claws depending outwardly from said center section and being configured to interlock with said plurality of claws of said second claw pole segment; and
    a ring magnet disposed in a channel in said center segment.

9. The rotor as in claim 8, wherein said ring magnet is configured to have a plurality of poles of alternating polarity, said plurality of poles being aligned with said first plurality of claws, said second plurality of claws and the plurality of claws of said first claw pole segment and said second claw pole segment.

10. The rotor as in claim 8, wherein said center section of said center segment provides a surface area disposed between said first plurality of claws and said second plurality of claws.

11. The rotor as in claim 10, wherein said channel is disposed in said surface area and said ring magnet is configured to have a plurality of poles of alternating polarity, said plurality of poles being aligned with said first plurality of claws, said second plurality of claws and the plurality of claws of said first claw pole segment and said second claw pole segment.

12. The rotor as in claim 8, wherein said center segment comprises a first center section and a second center section, said first center section having a first plurality of claws at one end and an axial shelf at the other end, said second center section having a second plurality of claws at one end and an axial shelf at the other end, said first plurality of claws depending outwardly from said center segment and being configured to interlock with said plurality of claws of said first claw pole segment, said second plurality of claws depending outwardly from said center segment and being configured to interlock with said plurality of claws of said second claw pole segment;

a channel being defined by said axial shelf of said first center section and said axial shelf of said second center section; and a ring magnet disposed in said channel.

13. The rotor as in claim 12, wherein said ring magnet is configured to have a plurality of poles of alternating polarity, said plurality of poles being aligned with said first plurality of claws, said second plurality of claws and the plurality of claws of said first center section and said second center section.

14. The rotor as in claim 13, wherein said ring magnet being configured to increase the magnetic field strength of the rotor.

15. A method for increasing the power density of an electric machine, comprising:

locating a pair of electrically excitable field coils about a shaft;

encasing one of said pair of field coils with a first pair of interlocking claws and encasing the other one of said pair of field coils with a second pair of interlocking claws;

disposing a plurality of magnets between said first and second pairs of interlocking claws wherein said plurality of magnets increase the magnetic fields generated by said pair of field coils.

16. The method as in claim 15, wherein the number of said plurality of magnets is equal to the number of interlocking claws encasing one of said pair of field coils.

17. The method as in claim 15, wherein the poles of said plurality of magnets are positioned in an alternating fashion and are configured to align with said claws encasing said pair of field coils.

* * * * *